C. R. MESTON.
LUBRICATING BEARINGS.
APPLICATION FILED APR. 23, 1909.
947,529.
Patented Jan. 25, 1910.
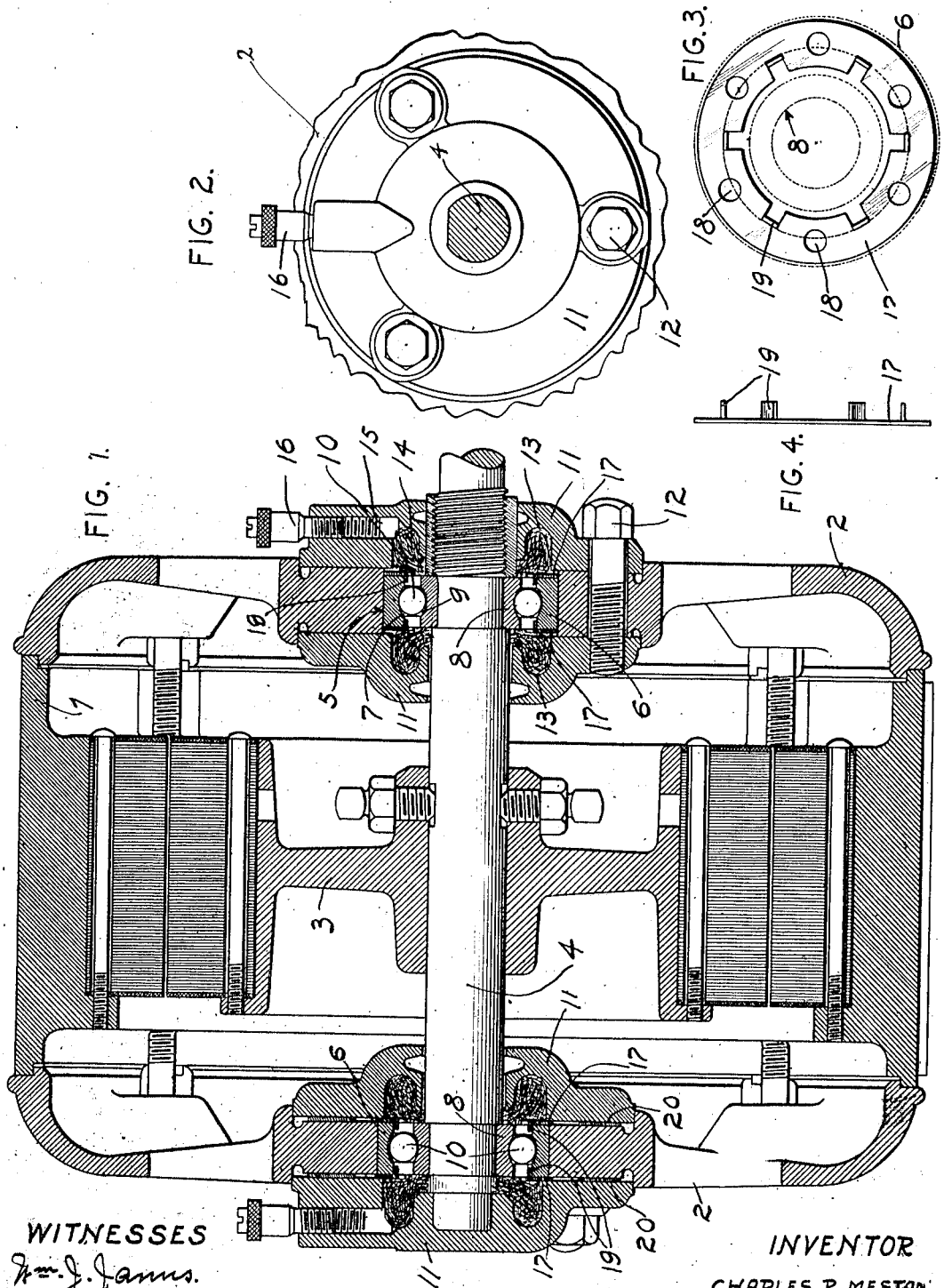
WITNESSES
INVENTOR
CHARLES R. MESTON
BY ATT'Y

UNITED STATES PATENT OFFICE.

CHARLES R. MESTON, OF ST. LOUIS, MISSOURI, ASSIGNOR TO EMERSON ELECTRIC MANUFACTURING COMPANY, OF ST. LOUIS, MISSOURI, A CORPORATION OF MISSOURI.

LUBRICATING BEARINGS.

947,529.  Specification of Letters Patent.  Patented Jan. 25, 1910.

Application filed April 23, 1909. Serial No. 491.688.

*To all whom it may concern:*

Be it known that I, CHARLES R. MESTON, a citizen of the United States, residing at St. Louis, Missouri, have invented a certain new and useful Improvement in Lubricating Bearings, of which the following is a full, clear, and exact description, such as will enable others skilled in the art to which it appertains to make and use the same, reference being had to the accompanying drawings, forming part of this specification, in which—

Figure 1 is a vertical section taken through the center of a motor equipped with my improved type of bearings; Fig. 2 is a side elevation of one of the bearings, the armature shaft being shown in section; Fig. 3 is an elevation of one of the plates made use of in my improved bearing for holding the absorbent oil-distributing ring in its proper position; Fig. 4 is an edge view of the retaining plate.

My invention relates generally to improved means of lubricating bearings and more particularly to the bearings for the armature shafts of electric motors, my object being to provide simple means in a bearing for maintaining the absorbent oil-distributing material in the annular pockets provided therefor.

Heretofore, in bearings employing oil-distributing felt or analogous fibrous material, it has been found that fibers from the material have been carried into the bearing during the operation of the shaft, which action tends to interfere with the free operation of the bearing, and it is the purpose of my invention to overcome this objection by arranging a thin metal plate between the bearing proper and the annular pocket or recess occupied by the oil-distributing material, which plate holds said material in proper position and prevents fibers from becoming detached therefrom and passing into the bearing.

Referring by numerals to the accompanying drawings, 1 designates the body of the motor housing, 2 the side plates thereof, 3 the armature, and 4 the armature shaft, all of which parts are ordinarily well-known constructions.

Formed in the center of each side plate 2 is an opening 5, and rigidly fixed therein is a hardened metal ring 6, on the inner face of which is formed ball-race 7. Rigidly fixed on the shaft 4, directly opposite this ring 6, is a ring 8, in the periphery of which is formed a ball-race 9, and positioned between the rings 6 and 8 and operating in the ball-races formed therein are hardened metal balls 10, thus forming ball-bearings for the armature shaft. 11 indicates plates which are applied to the inner and outer faces of the side plates 2 around the ball-bearings just described, and said plates 11 being rigidly held in position upon the plates 2 by means of screws or bolts 12.

Formed in the inner face of each plate 11, immediately adjacent the opening therethrough, is an annular groove or pocket 13 which is occupied by felt or analogous absorbent fibrous material 14, which is saturated with oil introduced through an aperture 15 formed in the top of the outer one of each pair of plates 11, said aperture being normally closed by a screw plug 16. The pockets 13 are so formed in the plates 11 that they occupy positions directly opposite the spaces between the rings 6 and 8, and in order to partially close these spaces so as to prevent the edges of the oil-saturated material 14 from coming into contact with the balls 10, I provide thin metal rings 17 which are applied to the side faces of the rings 6; and the inner edges of said rings 17 terminate immediately adjacent the outer edges of the rings 8. These rings 17 are perforated, as designated by 18, to permit the oil-saturated material to lubricate the races in the rings 6 and 8, and to maintain these retaining rings 17 in proper position, tongues 19 are bent from the inner edges of said rings 17, which tongues project laterally and engage against the inner surfaces of the rings 6. Thus said rings 17 occupy positions between the bearing rings 6 and the oil-distributing material 14, permitting oil from said material 14 to lubricate both rings 6 and 8 and pass into the ball-races formed therein. In the bearing shown on the lefthand side of the motor in Fig. 1, I have shown gaskets 20 of rubber or analogous material located between the plates 11 and the plate 2, which gaskets form an efficient packing to prevent the leakage of oil outward between said plates 11 and 2.

Bearings of my improved construction are very simple, and while particularly adapted for electric motor construction, can be advantageously employed on any shaft or spindle.

It will be readily understood that minor changes in the construction, arrangement and combination of the various parts of my improved bearing can be made and substituted for those herein shown and described without departing from the nature and principle of my invention.

I claim:

1. The combination with a shaft of a bearing ring carried thereby, a second bearing ring around the first mentioned bearing ring, anti-friction bearing members interposed between the rings, oil-distributing material located adjacent the side faces of the bearing rings and perforated plates arranged between the rings and the oil-distributing material.

2. The combination with a shaft of a bearing ring carried thereby, a second bearing ring around the first mentioned bearing ring, anti-friction bearing members arranged between the bearing rings, a body of oil-distributing material located adjacent the side faces of the bearing-rings and a perforated plate interposed between the bearing rings and the body of oil-distributing material.

3. The combination with a shaft of a bearing ring carried thereby, a second bearing ring inclosing the first bearing ring, anti-friction bearing members interposed between the bearing rings, oil-distributing material located adjacent the side faces of the bearing rings, and means interposed between the bearing rings and the oil-distributing material for preventing portions of said material from entering the space between the rings.

4. The combination with a shaft of a bearing ring carried thereby, a second bearing ring around the first mentioned ring, anti-friction bearing members arranged between the two rings, plates adjacent the sides of the bearing rings in which plates are formed pockets, oil-distributing material located in said pockets, and perforated plates interposed between the first mentioned plates and the bearing rings.

5. The combination with a shaft of a bearing ring carried thereby, in which ring is formed a ball race, a second bearing ring around the first mentioned ring there being a ball race formed in the second mentioned ring, a series of balls arranged for operating in the races, oil-distributing material held in position adjacent the sides of the bearing rings, and means interposed between said material and the bearing rings for preventing portions of said material from entering the space between the rings and the ball races.

6. In a motor, a shaft, bearings therefor, which bearings each comprises a pair of rings between which is interposed a series of balls, plates arranged adjacent the bearings, there being pockets formed in said plates, oil-distributing material located in said pockets, means interposed between the plates and the bearings for retaining the oil-distributing material in the pockets, and means formed in one of said plates whereby oil is delivered to the pockets and the material therein.

7. The combination with a shaft, of a bearing ring carried thereby, a bearing ring encircling the first-mentioned ring, anti-friction bearing members arranged between the two bearing rings, plates arranged adjacent the sides of the bearing rings, in which plates are formed annular pockets, oil-distributing material located in said pockets, and means interposed between the outer bearing ring and the plates for maintaining the oil-distributing material in the pockets.

8. The combination with a shaft and its bearings, which latter comprise rings arranged in pairs and having interposed balls, of oil-distributing material arranged adjacent and wholly outside the bearings, perforated plates arranged between the bearings and the oil-distributing material, and means whereby oil is delivered to the distributing material.

9. In a bearing employing bearing rings interposed anti-friction elements and oil-distributing material, a perforated plate adapted to be positioned between the bearing rings and the oil-distributing material, and ears integral with the plate and engaging one of the bearing rings to maintain said plate in proper position.

10. The combination with a shaft, of a bearing ring carried thereby, a bearing ring encircling the first-mentioned ring, anti-friction bearing members arranged between the two bearing rings, plates adjacent the sides of the bearing rings, in which plates are formed pockets, oil-distributing material located in said pockets, perforated plates interposed between the bearing rings and the oil-distributing material carrying plates, and ears integral with said perforated plates, which ears engage one of the bearing rings for maintaining said plates in proper position.

In testimony whereof I hereunto affix my signature in the presence of two witnesses, this 19th day of April, 1909.

CHARLES R. MESTON.

Witnesses:
F. R. CORNWALL,
LENORE CLARK